US005836205A

United States Patent [19]
Meyer

[11] Patent Number: 5,836,205
[45] Date of Patent: Nov. 17, 1998

[54] LINEAR ACTUATOR MECHANISM

[75] Inventor: Steven M. Meyer, 1164 S. Valentine Way, Lakewood, Colo. 80228

[73] Assignee: Steven M. Meyer, Lakewood, Colo.

[21] Appl. No.: 800,300

[22] Filed: Feb. 13, 1997

[51] Int. Cl.[6] ................................................ F16H 19/04
[52] U.S. Cl. .................... 74/89.17; 74/422; 74/490.09
[58] Field of Search ............................. 74/89.17, 89.18, 74/89.19, 422, 490.09

[56] References Cited

U.S. PATENT DOCUMENTS

| | | | |
|---|---|---|---|
| 1,145,157 | 7/1915 | Mann | 74/33 |
| 1,384,339 | 7/1921 | Powell | 74/40 |
| 3,665,771 | 5/1972 | Blatt | 74/29 |
| 3,765,251 | 10/1973 | Whitanaek | 74/29 |
| 3,848,759 | 11/1974 | Goodacre et al. | 74/422 X |
| 4,270,404 | 6/1981 | Murakoshi | 74/89.17 X |
| 4,757,725 | 7/1988 | Beugin | 74/422 |
| 4,941,396 | 7/1990 | McCabe | 74/131 X |
| 5,113,224 | 5/1992 | Tsuda | 74/29 X |
| 5,267,478 | 12/1993 | Stridsberg | 74/89.17 |

FOREIGN PATENT DOCUMENTS

| | | | |
|---|---|---|---|
| 59-23151 | 2/1984 | Japan | 74/89.17 |
| 6-159466 | 6/1994 | Japan | 74/89.17 |
| 569889 | 11/1975 | Switzerland | 74/422 |
| 753202 | 7/1956 | United Kingdom | 74/422 |

OTHER PUBLICATIONS

Patent Search Index prepared by Applicant Prior Apr. 25, 1997.
NASA Contract NAS–7–918 Tech.Support Pkg on Prior Apr. 25, 1997.
Magnetostrictive Actuators for Cryogenic Applic Prior Apr. 25, 1997.
Competitor Index listing 63 Companies Prior Apr.25, 1997.
67 Manufacturer's Descrip.Material numbered 0–66 in alphabtical order by Manufacturer Prior Apr. 25, 1997.
Video: phd SG Powered Slides, PHD, Inc. Prior Apr. 25, 1997.

*Primary Examiner*—Allan D. Herrmann
*Attorney, Agent, or Firm*—Ronald R. Snider

[57] ABSTRACT

A linear actuator has four drive gears which engage two racks. The actuator movable member may comprise two racks which have gear teeth which face inwardly and towards each other, or a single rack which has gear teeth which faces outwardly. In either case, four gear drives to engage the rack, two gear drives on each side. A plurality of linear actuators may be used to provide for position control in two or more directions. Control is provided by a servo mechanism.

18 Claims, 12 Drawing Sheets

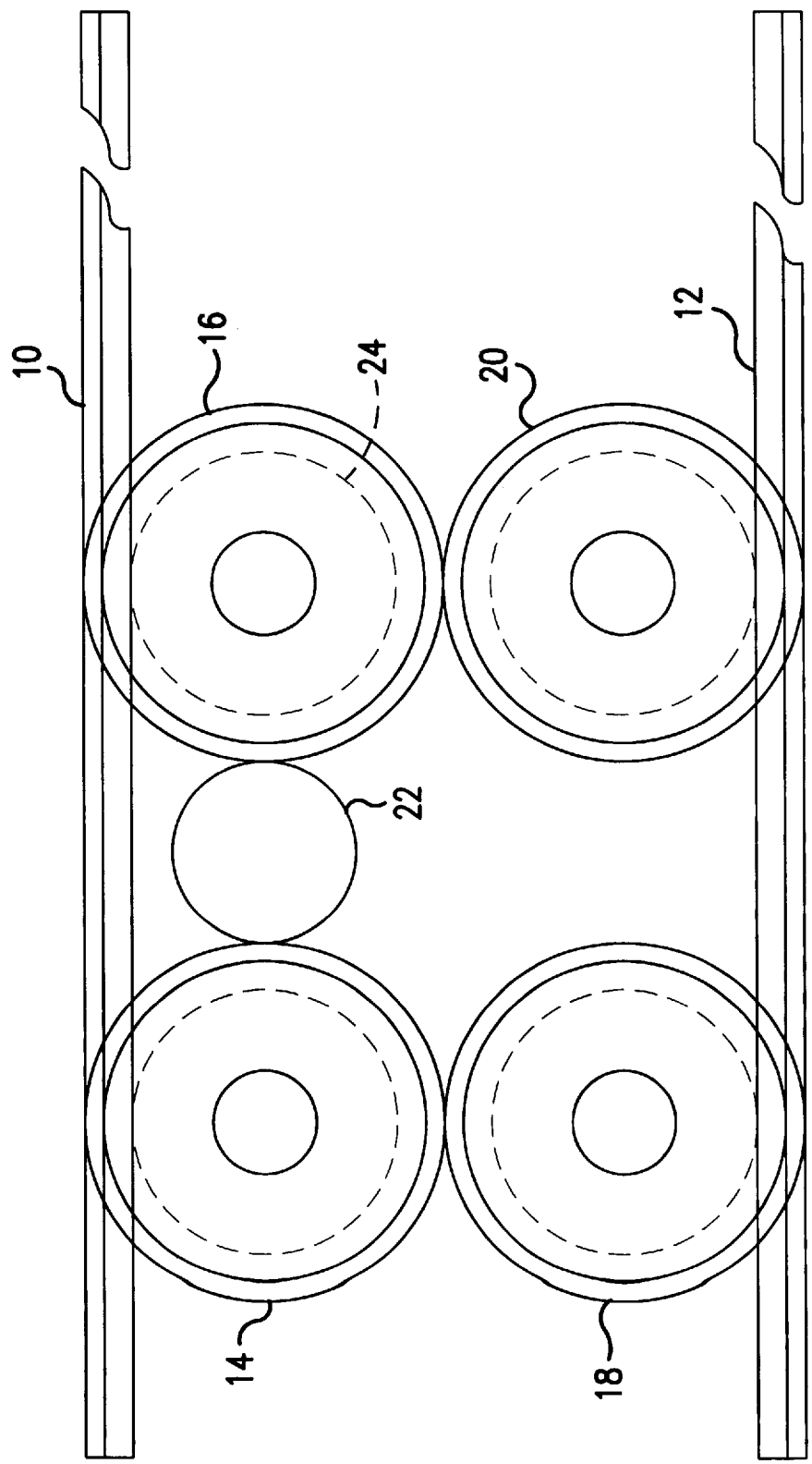

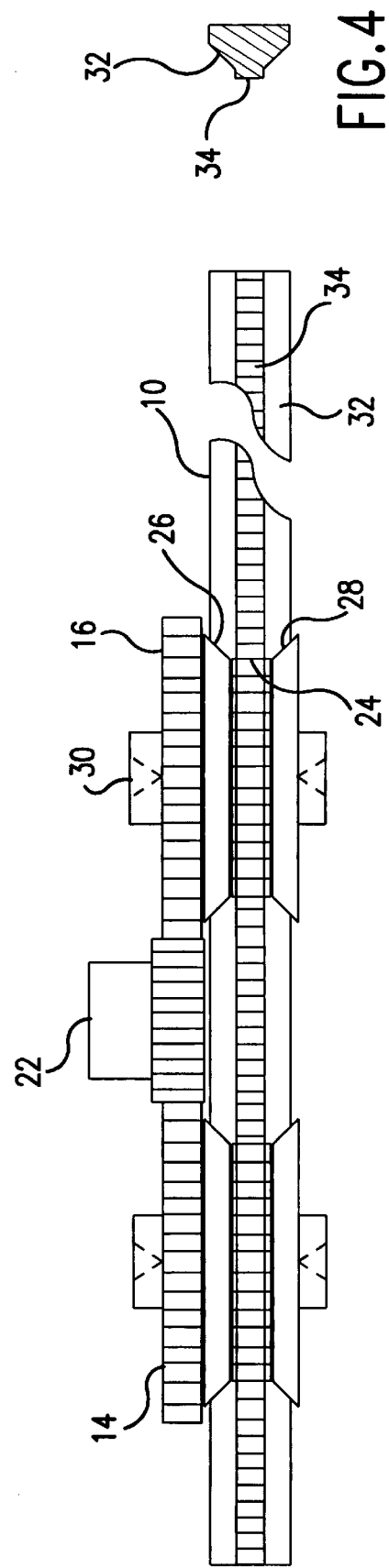

5,836,205

LINEAR ACTUATOR MECHANISM

BACKGROUND OF THE INVENTION

(1) Field of the Invention

This invention is a linear actuator which can be used in multiples in order to achieve movement in one, two, or three axes. The linear actuators of this type can be controlled by servo mechanisms of any type as long as position feedback is provided, such as by encoders.

The field of Linear Actuators is concerned with the task of moving loads from one location to another. The actuator must transfer mechanical power to loads of various weights and inertias, and move through space in a predetermined axis of motion without movement in the other two axes. Creation of a linear actuator involves a series of design tradeoffs to achieve a desired speed, acceleration, torque, accuracy and repeatability.

(2) The Prior Art

Linear actuators having inwardly facing gear teeth have been known in the prior art as exemplified by U.S. Pat. Nos. 4,941,396, 4,757,725, 1,384,339, and 1,145,157. In each of these examples, gears engage the inwardly facing teeth of the linear device such as piston, or linear gear rack.

U.S. Pat. Nos. 3,665,771, 5,113,224, and 3,765,251 show other examples of linear actuators, but where the actuator does not have teeth which face inwardly and towards each other and where there are no balanced forces on the linear actuator.

Linear actuators are a system of components that are organized to result in linear motion. There are five main categories of components that are required for an actuator to operate: 1) power source, 2) power transmission, 3) mechanical guidance and support, 4a) control and 4b) feedback. (Feedback and control are combined since feedback is provided as a separate component that must be integrated into a system solution with its individual housing, coupling and supporting structure which results in significant compromise in the final product.)

Belts and chains tend to suffer from accuracy problems, tensioning problems, and mechanical overhead needed to support these systems. Leadscrews have significant mass and acceleration problems as well as mechanical overhead required to support them. Most of these issues are eliminated in the advanced linear actuator design of Applicant's invention.

Discussion of the Major Elements in Linear Actuators

1. Power source: The source of motive power for an actuator can be hydraulic, pneumatic or electric. Hydraulic and pneumatic power sources are generally based on pistons which are inherently linear combining the power source and means of transmission. This makes fluid power (pneumatic and hydraulic) simpler than electric, but does not allow the use of gear reduction for improved mechanical advantage. Also, fluid power systems are very expensive to control accurately. Electric systems are generally based on rotary electric motors which must be converted to linear motion through different mechanical means (see power transmission). The electric systems are easy and inexpensive to control, often using gear reduction to reduce input power, but can have significant mechanical error (backlash) in coupling to the load.

2. Power transmission: The most common means of power transmission for rotary power sources are: a) sprocket and chain, b) belt and pulley, and c) leadscrews. These rotary systems easily permit the use of gear reducers to optimize the speed and torque of the power source for a specific application.

In most hydraulic and pneumatic systems, the means of power transmission and the source of motive power are one and the same. The cylinder is linear in nature using a piston for the stroking element which is directly coupled to the load. Linear systems (fluid and electric powered) do not permit the use of gear reducers and most power sources tend to output diminishing incremental power with increasing size.

3. Support and guidance: In linear systems the most common forms of support and guidance are dovetail ways and various linear bearing systems including crossed roller bearings. The most common forms of support and guidance in rotary systems are a combination of ground rods and bearings, and a variety of general-purpose and custom box extrusions.

Other than increasing the physical envelope of the linear actuator, the effect of the mechanical support system is negligible in the operation of the single axis linear actuator. However, when two or more axes are combined, which is very common, the increased mass build-up of the mechanical support and guidance becomes severely limiting to the performance of the overall system. Additionally, in almost all cases, there is a need to provide two parallel supports and the parallel alignment of the two guides on a baseplate becomes a critical element in a properly operating system. In some systems, the parallel axes have to both be powered and synchronized and mounted to a common baseplate in order for the system to operate correctly, further impacting mass and cost.

4. Electronic Control Systems provide improved performance and reduce stress and, in the case of electrically powered systems, provide the basis for fully programmable speed torque and acceleration.

In order to hold down cost and reduce complexity in most hydraulic and pneumatic systems, the typical means of control is on-off with the use of timers to achieve the desired linear displacement. This type of control generally results in poor accuracy and very high mechanical stresses since starting and stopping cannot be accurately controlled. With the advent of higher performance valves, it has recently become possible to do variable speed control and accurate position reference so that the fluid based systems can achieve performance similar to electric based systems, but these solutions are generally very expensive.

A major advantage of today's high performance electronic control systems is the ability to minimize mechanical jerk, which occurs in all systems and drastically reduces the life of most mechanisms. Instantaneous acceleration torque requirements in the design of the Advanced Linear Actuator will use control system technology to greatly reduce impulse type mechanical stresses.

5. Feedback: Many current actuators do not use position feedback due to allowable position error or accuracy tolerances. As the demand for higher performance actuators increases, the use of feedback will become more prevalent.

Feedback technology is available in linear and rotary forms based on lasers, light emitting diodes, and inductive systems such as resolvers. The accuracy and repeatability of any actuator is, entirely dependent on the feedback used, making feedback technology critical. Also, since the feedback element is a separate component not directly coupled to the load, most systems suffer from mechanical error, commonly known as backlash, which interferes with both linear position accuracy and repeatability.

The effects of backlash cannot be avoided in closed-loop systems when the position reference is not part of the actuator itself. By combining the position reference codestrip with the rack gear (moving or stationary) the ALAC position reference is independent of the other system components and is therefore an absolute reference. This is a substantial improvement over other arrangements because of the inherent accuracy and repeatability.

BRIEF SUMMARY OF THE INVENTION

This invention provides a highly integrated system which optimizes actuator technology by reducing the mass of the components. Very high performance characteristics can be achieved across a wide range of loads, accuracies and speed requirements across many industry applications.

This invention provides an improved solution to many applications in electronic component assembly, chip handling and testing, air bearing XY work tables, washing and drying systems, systems and integrators for hard drives for computer systems, laser profiling systems, fluid metering and dispensing, semiconductor and hard disk drive media handling, optical inspection systems, laser marking, robotic systems and the like.

The invention uses four points of gear contact to transfer power from a single input source to two rack gears. This arrangement provides extremely high power density. The minimum number of contact points to constrain a linear actuator in two dimensions is three. Four points of contact provide a system in which torque is applied to the linear element symmetrically.

The invention uses four points of contact with a minimum single input power source. More power inputs can be used, but are not necessary for the simplest implementation of the concept.

The invention eliminates mechanical errors and cumulative error by coupling the feedback reference directly to the load. This further eliminates the need for high precision components and serves to reduce cost in the mechanical system.

Alignment of the actuator in the third dimension (Z-axis) can be accomplished through stationary or rolling "V" guides as shown, or through the use of simple wear pads as part of the actuator housing.

In order to further integrate the bearing and guidance of the actuator, a total of eight contact points must be provided to constrain a rectangular actuator in three dimensions. Two solutions are proposed: 1) four chamfered faces on the two racks (two on each rack) with mating rolling surfaces sandwiched with the power transmission gear system, or 2) the use of ball bearings captured in a wedge-shaped bearing block.

The invention is scalable from micromachinery to very large systems.

The use of sliding contact rails permits the elimination of feedback wiring by using electronic means to encode the position reference information on the same contacts that carry power to an electric motor. In the case of a fluid-powered system, the same technique can be applied to eliminate wiring and connectors associated with the feedback mechanism.

In the first embodiment of this invention, Applicant provides first and second inwardly facing gear racks which are fixed with respect to each other. Between these two inwardly facing gear racks are placed a first pair of drive gears which mesh with both racks. A second pair of drive gears is also placed between the racks, with a pinion between two of said drive gears where the pinion is located in contact with two drive gears meshing one side. Still further, in this embodiment, since the drive gears may provide undue outward thrust against the inwardly facing racks, backup rollers may be placed along the racks to prevent outward movement. The drive gears may also be held in place by means of beveled washers which extend towards the rack from the gear shaft for the purpose of preventing movement of the rack perpendicular to the axis of the drive gear.

Another feature of this invention is the use of backup rollers which may be used to press against the back of each rack of the actuator.

In another embodiment of this invention, the actuator member may have chamfered edges upon two of which gear teeth are placed, and which gear teeth are engaged by cylindrical gears which engage the chamfered edges.

In another embodiment of this invention, the linear actuator is an actuator rack member having parallel gear teeth on opposite outwardly facing sides, two first drive gears on a first side of the rack for engaging one of said opposite surfaces and two second drive gears on a second side of said rack said drive gears engaging the other of said opposite surfaces and a single pinion drive gear in engagement with one of said first drive gears and said second drive gears. This linear actuator may also include chamfered edges adjacent each of said racks, or chamfered rack faces on said linear actuator which engage cylindrical gears.

It is the further object of this invention to provide linear actuators in combination where two or more linear actuators are used together. A typical use is where two linear actuators are used in different planes, and where they move perpendicular to each other.

BRIEF DESCRIPTION OF THE DRAWINGS

FIG. 2 shows a rack and gear assembly of FIG. 1 further including bevels adjacent to drive gears which position the gears with respect to the racks.

FIG. 3 shows a beveled drive gear assembly of the type used with respect to FIG. 2.

FIG. 4 shows a cross-section of one side of a linear actuator device of FIG. 2 or FIG. 1 where there is a beveled surface and a gear surface for engaging drive gears.

FIG. 5 shows a side view of the actuator of FIG. 2.

DETAILED DESCRIPTION

Figure 1:
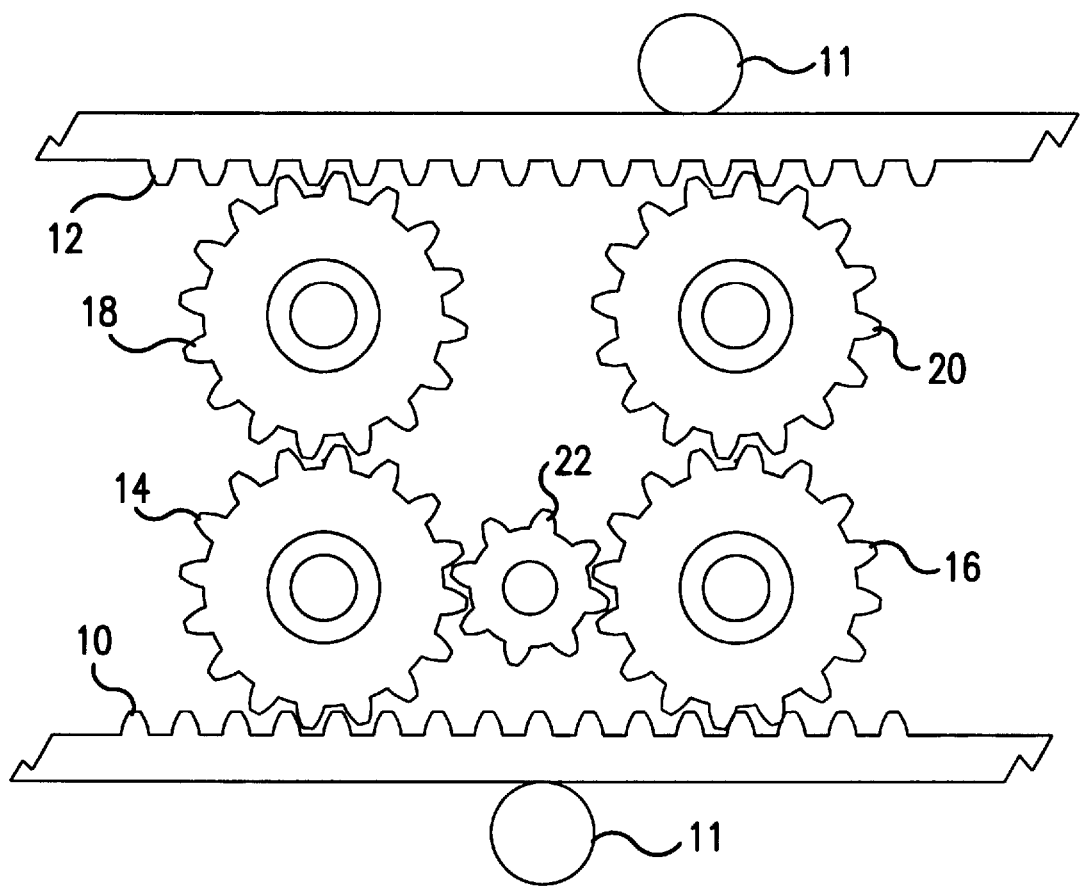
FIG. 1 shows a linear actuator rack and gear assembly where the racks face inwardly.

FIG. 1 shows a first gear rack 10 and a second gear rack 12 which face towards each other and which are fixed with respect to each other.

Figure 19:
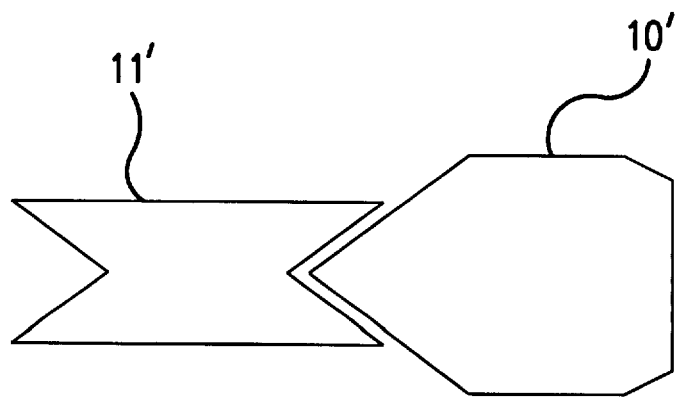
FIG. 19 shows an embodiment where the backup rollers and the back side of the racks are "V" shaped.

A pair of drive gears 14, 16 mesh with the first rack 10 and a pair of second drive gears 18, 20 engage the second rack 12. Located between the first and second drive gears 14, 16 is a driver pinion gear 22 which provides power to rotate drive gears 14, 16, 18 and 20. This basic drive scheme of FIG. 1 provides the same balanced gear drive force to drive gears 14, 16, 18 and 20 as well as to racks 10 and 12 by means of the single pinion gear drive 22. Back rollers 11 may be used at one or more locations along the outside of each rack 10, 12. The back rollers may be a "V" shape as shown in FIG. 19 where rollers 11' back up rack 10'.

In FIG. 2 there is shown a gear drive assembly similar to FIG. 1, but which includes in addition bevels on the sides of the gears and on the sides of the racks to provide for control or balancing of the thrust on the gears and the racks. Where the reference numerals refer to the same components as those shown in FIG. 1, the same reference numerals are used.

In FIG. 3 there is shown an exploded view of a beveled gear drive such as 14, 16, 18 or 20 as shown in FIG. 2. A rack gear 24 is shown with a smaller diameter, and it is this rack gear 24 which engages teeth along rack 10 or along rack 12. Extending outwardly from rack gear 24 are a pair of beveled washers 26 and 28 which are allowed to rotate freely on shaft 30. These beveled washers 26, 28 are used to hold the rack 10 in place with respect to gear drive 24. The gear drive 16 is shown at the top of FIG. 3, and it is this gear 16 which is in engagement with pinion 22, and also in the case of gear 16, in engagement with gear 20. It should be noted that gear assemblies 14, 18 and 20 are the same as that of gear assembly 16 shown in FIG. 3.

In FIG. 4, there is shown a cross-sectional view of a portion of a rack 10, which shows rack bevel 32 and rack teeth 34.

FIG. 5 shows a side view of the rack and drive gear assembly of FIGS. 1 through 4. Where reference numerals are the same, they are shown.

Figure 7:
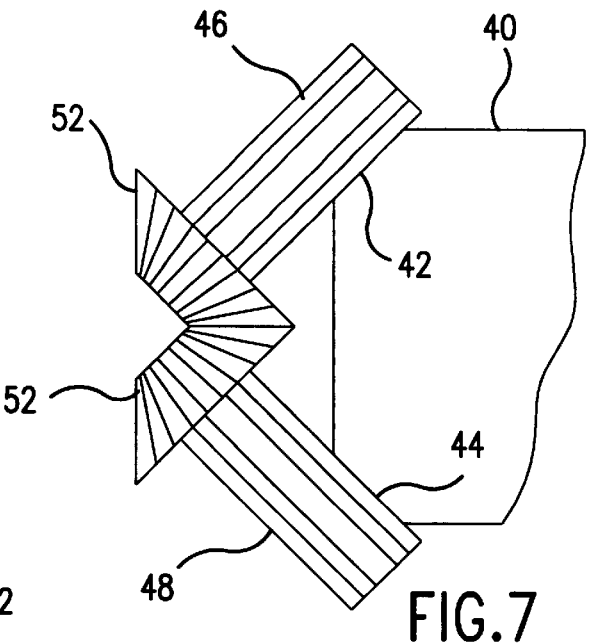
FIG. 7 shows an end view of the drive assembly of FIG. 6.
Figure 8:
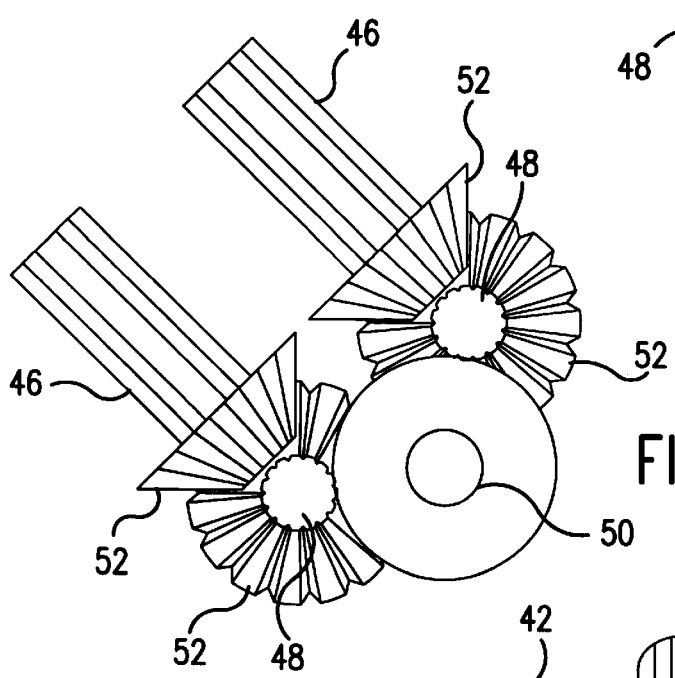
FIG. 8 shows a view of a drive in accordance with FIGS. 6 and 7 with four cylindrical drives in engagement with two surfaces on one side of a linear actuator.
Figure 6:
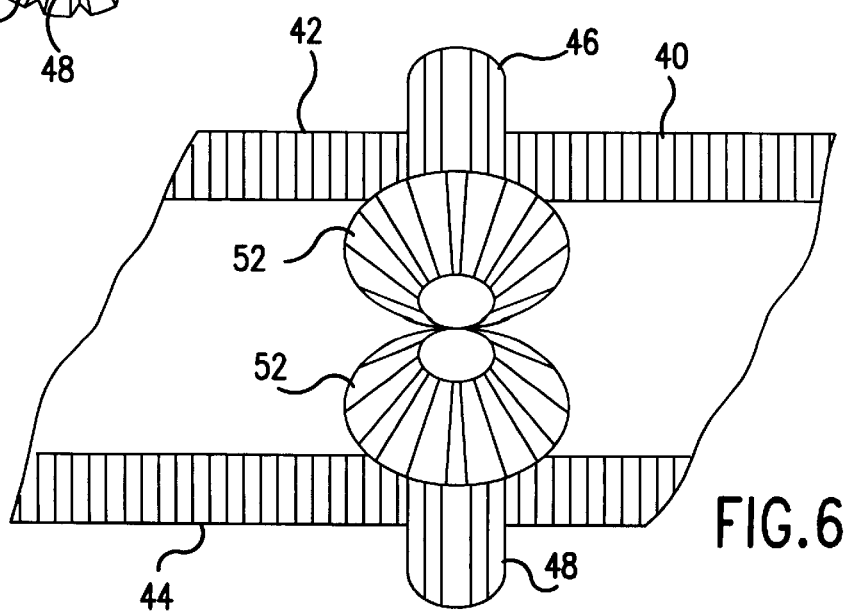
FIG. 6 shows an embodiment wherein the linear actuator has beveled surfaces on each side, and wherein the beveled surfaces include gear teeth for engaging cylindrical gears which are driven by conical gears.

In FIGS. 6, 7, and 8, there is shown an alternative drive system or gear system for use with a rack or a linear actuator.

In FIG. 7, there is shown a linear actuator rack 40 having two beveled surfaces which are at 90 degrees to each other, and wherein each beveled surface, 42, 44, has parallel gear teeth. Oppositely facing gear teeth 42 and 44 are drive gears 46 and 48 which have parallel teeth. As shown in FIGS. 6 and 7, the drive for drive gears 46 and 48 may be provided on either shaft 46 or 48 or by a third beveled pinion gear 50 which engages beveled drive gears 52.

As seen in FIG. 8, there are two sets of drives which are driven by a common pinion 50. The two sets of drives shown include drive shafts 46 and drive shafts 48. The drive pinion 50 functions essentially the same as drive pinion 22 shown in FIGS. 1 and 2 in that it balances the drive.

In order to provide opposing drives, two other sets of beveled drive gears 52 may be attached to the opposite side of beveled pinion gear 50 shown in FIG. 8 to provide drive to an opposite linear rack (not shown).

Figure 9:
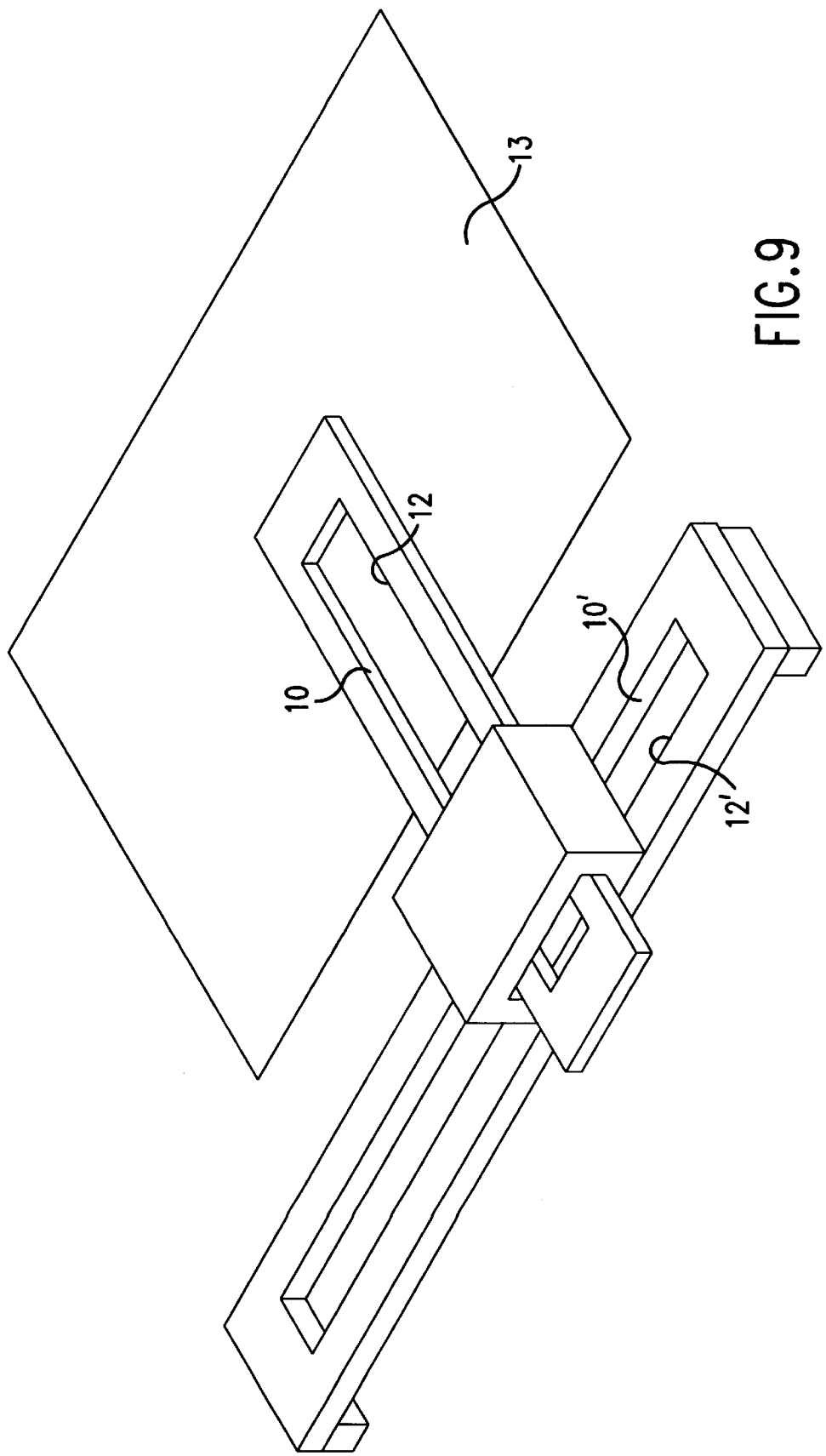
FIG. 9 shows a linear actuator of the type of FIGS. 1 and 2 wherein two actuators are positioned together to provide two axis movement.

In FIG. 9 there is shown a two axis linear actuator arrangement with inwardly facing first and second gear racks 10 and 12 in the top of the actuator and 10' and 12' in the bottom mutually perpendicular actuator. These actuators are shown joined together at their ends. FIG. 9 also shows work area 13 such as an XY worktable.

Figure 10:
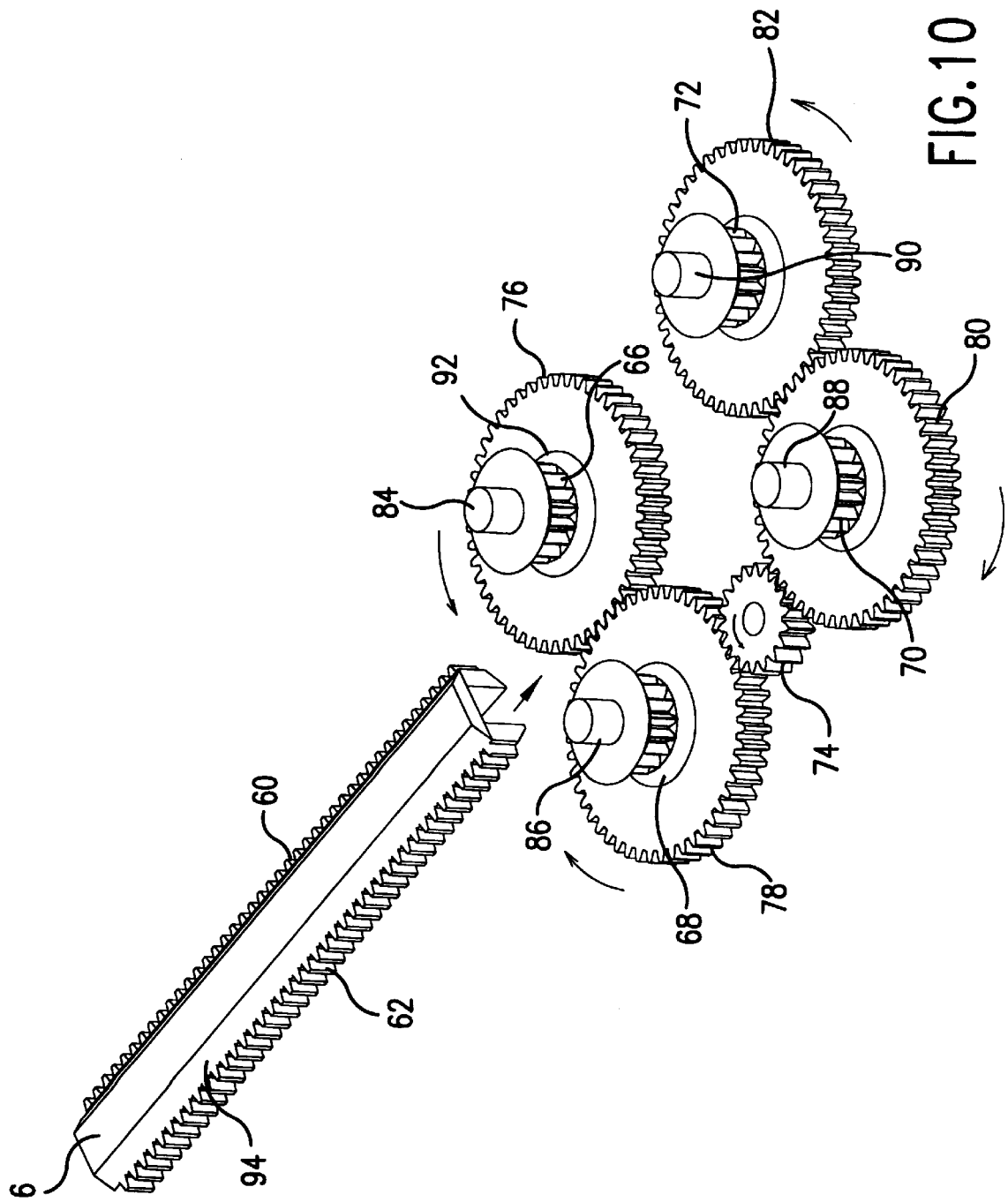
FIG. 10 shows a linear actuator of another embodiment wherein the actuator has outwardly facing teeth and rides between rollers.

FIG. 10 shows an exploded view of another embodiment of the linear actuator of this invention wherein gear teeth 60, 62 are placed on the exterior side of a linear actuator 64. This is the inverse of the actuator shown in FIG. 1 where the gear teeth are facing inwardly. The drive assembly for linear actuator 64 is essentially the same as that shown in FIGS. 1, 2, and 3. Here, the gears 66, 68, 70 and 72 engage the rack 64 at teeth 60 and 62 in order to provide balance forces on the rack 64. Pinion 74 drives a pair of the drive wheels 68, 70 which are along one side of the linear actuator 64 and which engage teeth 62. This provides balance forces on the actuator in a manner similar to FIG. 1, except that the gears are on the outside of the actuator instead of the inside of the actuator. Drive gear wheels 76, 78, 80 and 82 engage gear wheel 74 to drive the shafts 84, 86, 88 and 90. The surfaces such as surface 92 may be either flat or beveled. In the illustration of FIG. 10, the surfaces 92 are beveled to match the bevel 94 shown on linear actuator 64.

Figure 11:
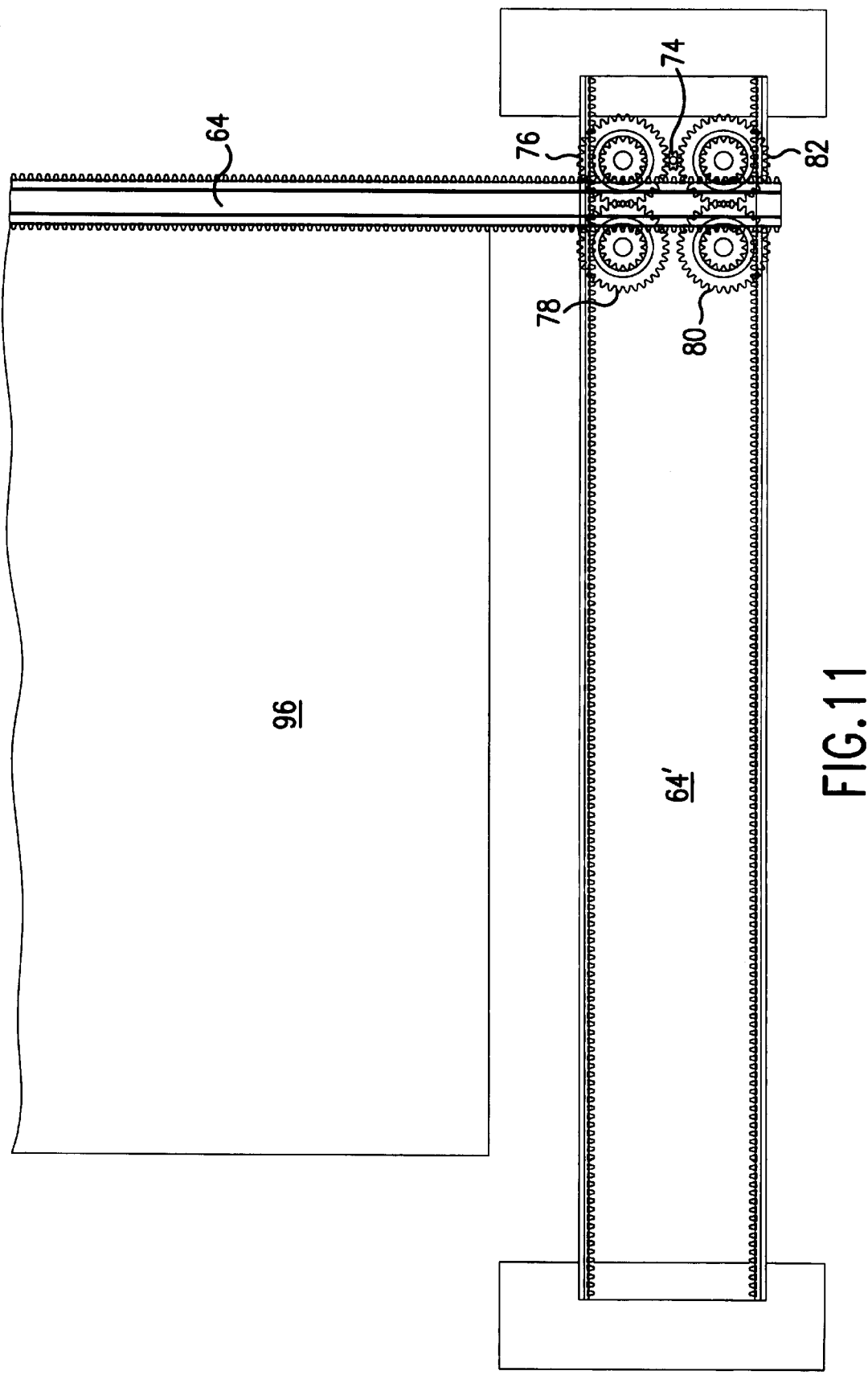
FIG. 11 shows a plurality of actuators for two axis movement wherein the actuators are constructed in accordance with FIG. 10.

In FIG. 11 there is shown a pair of actuators of the type shown in FIG. 10. The actuator 64 is shown on top of a second actuator 64' which moves in a transverse direction. In this assembly, two axis movement is provided for in a positionable surface or device 96.

Figure 12:
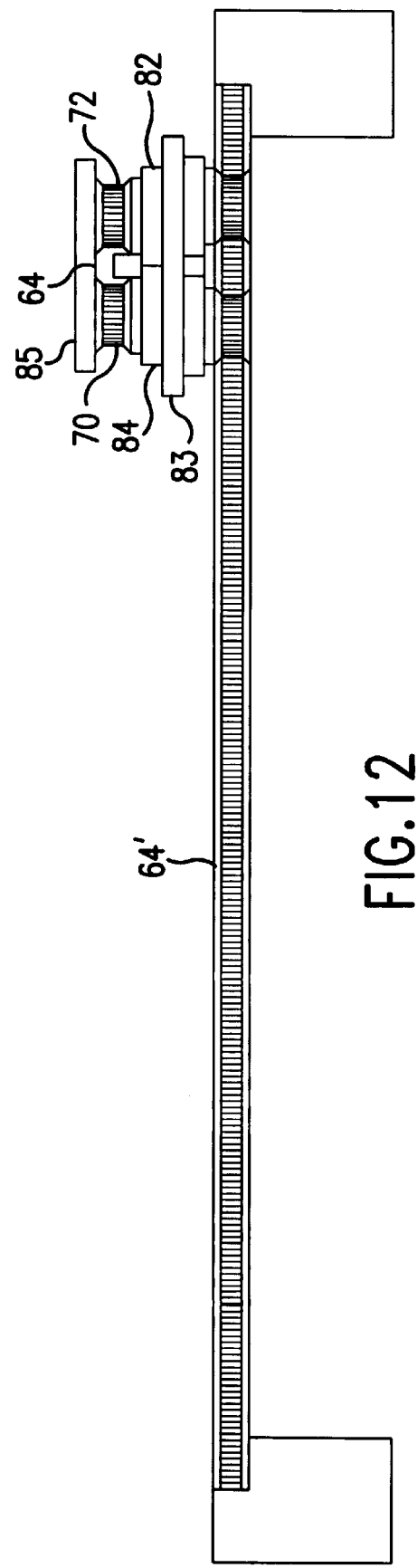
FIG. 12 shows a side view of the two axis actuator depicted in FIG. 11.

In FIG. 12 there is shown a side view of the two axis device of FIG. 11. The drives for the upper actuator include reference numerals which correspond to those of FIG. 10. FIG. 12 also shows carrier plates which are used to fix the relative positions of gears 74, 76, 78, 80 and 82. Plate 83 is referred to as a first carrier plate and plate 83 is a second carrier plate.

Figure 13:
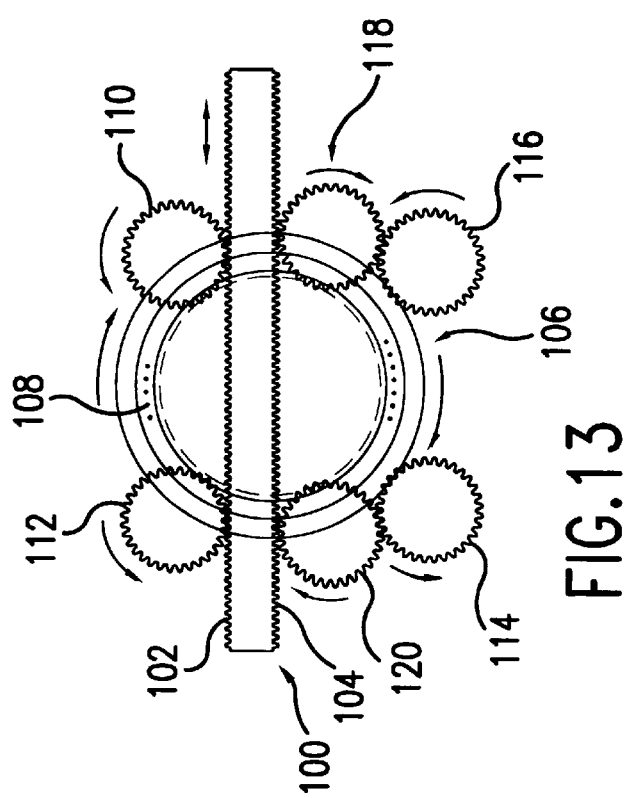
FIG. 13 shows another embodiment of the actuator wherein a motor having a stationary center and rotary outer ring is used to drive a linear actuator having outwardly facing teeth.

In FIG. 13 there is shown a linear actuator 100 having external or outwardly facing gear teeth 102, 104. In this embodiment, a motor having a rotatable external ring gear 106 is provided. The stator of the motor is indicated by reference numeral 108. Attached to the ring gear are power drive gears 110 and 112. Power drive gears 110 and 112 are in direct engagement with the teeth 102 on one side of the linear actuator 100. As can be seen in FIG. 13, these drive gears are moved in the same direction by action of the external ring 106 of the motor.

Figure 14:
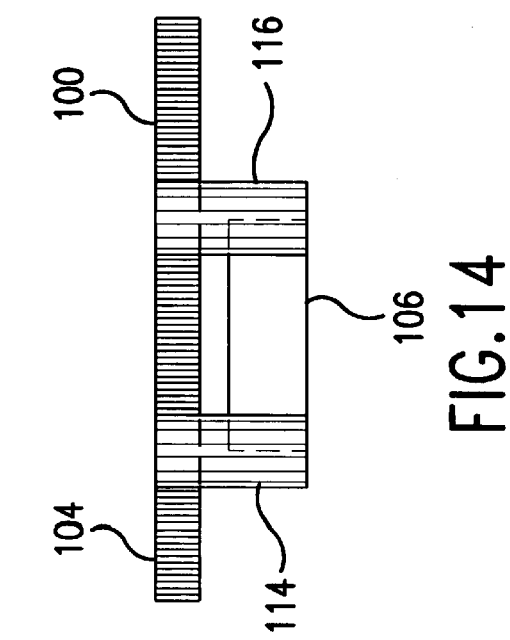
FIG. 14 shows a side view of FIG. 13.

In order to provide the proper direction of movement on the opposite side of the linear actuator 100, it is necessary to provide idler gears 114 and 116 which provide the connection between linear actuator drive gears 118 and 120 and external ring 106. FIG. 14 shows a side view of FIG. 13 depicting external ring gear 106 and drive gears 116, 114. The linear actuator 100 is shown.

Figure 15:
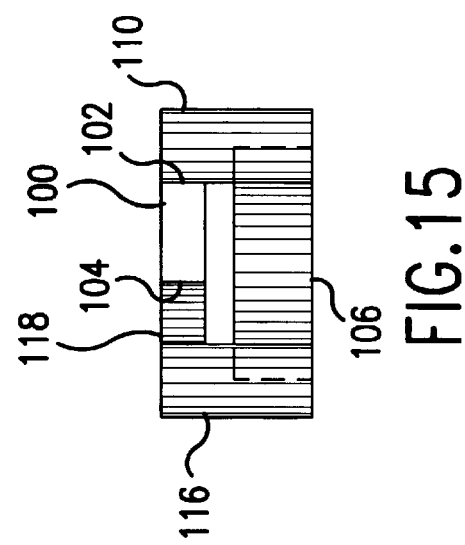
FIG. 15 shows an end-view of FIG. 13.

FIG. 15 shows an end view which depicts the arrangement of the linear actuator 100, the idler gears 118, and the drive gears 116 and 110.

Figure 16:
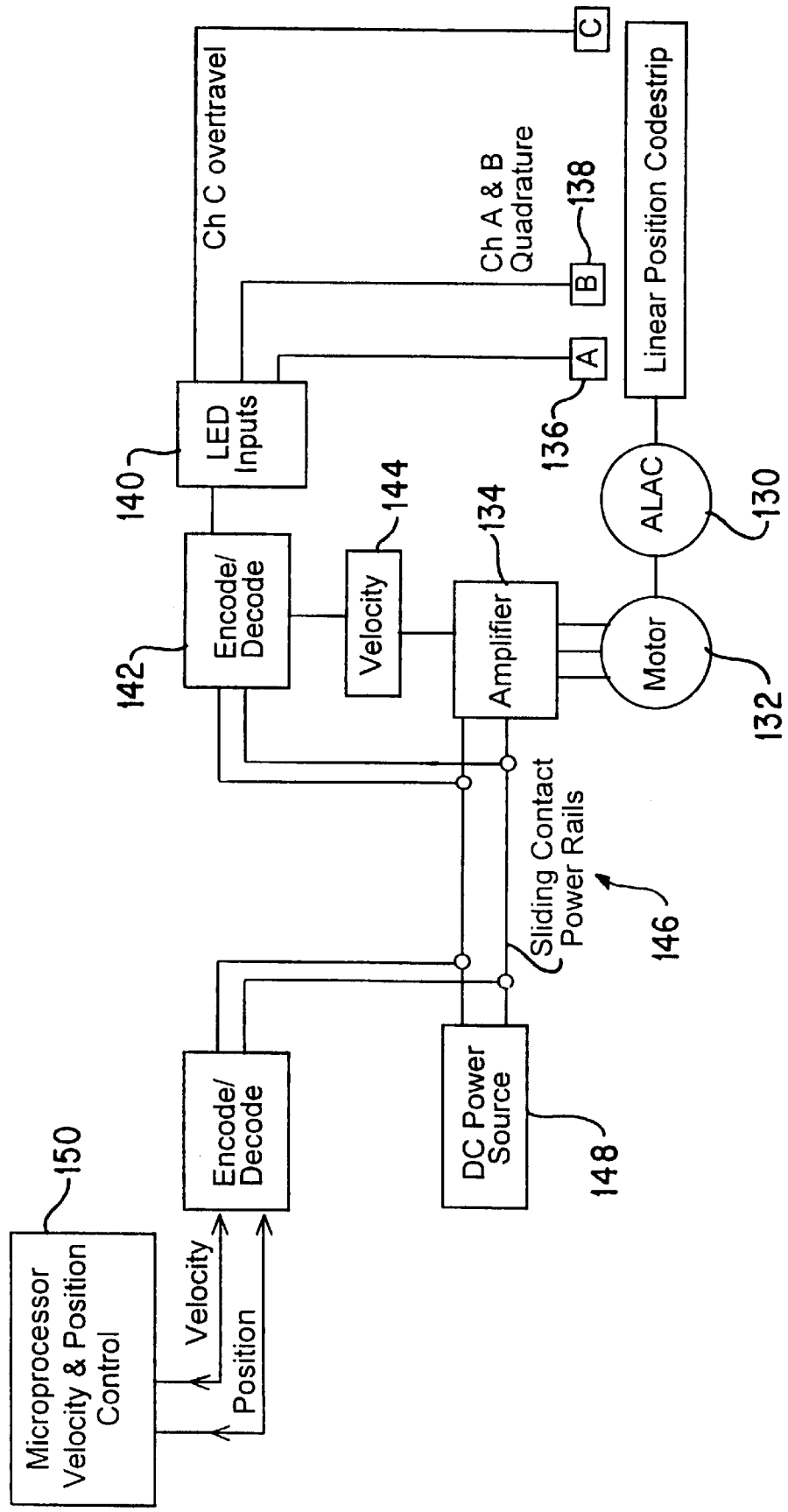
FIG. 16 shows a typical servo mechanism which can be used for control of the linear actuator of this invention.

In FIG. 16 there is shown a block diagram of a typical digital electrical servo which can be utilized with this invention. The linear actuator 130 is driven by a motor 132. Motor 132 is in turn driven by an amplifier 134. The position of the linear actuator is sensed by sensors 136 and 138. The position of the linear actuator 130 is then received by the LED input-output device 140 which provides a position signal to encode-decode 142. A velocity feedback signal is applied to amplifier 134 from velocity signal generator 144.

DC power to the linear actuator is provided along the actuator by sliding contacts which ride along power rails which are integral to the actuator. Power rails are generally indicated as reference numeral 146. The DC power source is a constant power source which provides energy for amplifier 134. Also conducted along the contact power rails are control and error signals generated by microprocessor 150 or computer control means which generates velocity and position signals which are encoded and decoded from transmission to the amplifier 134.

The linear actuator in accordance with this invention may be driven by a servo mechanism which may take the form of electrical, analog or digital, hydraulic, or pneumatic. For purposes of illustration, Applicant includes herein FIG. 16 which is an electrical digital servo which may be used with any of the embodiments shown in FIGS. 1 through 15 herein.

Figure 17:
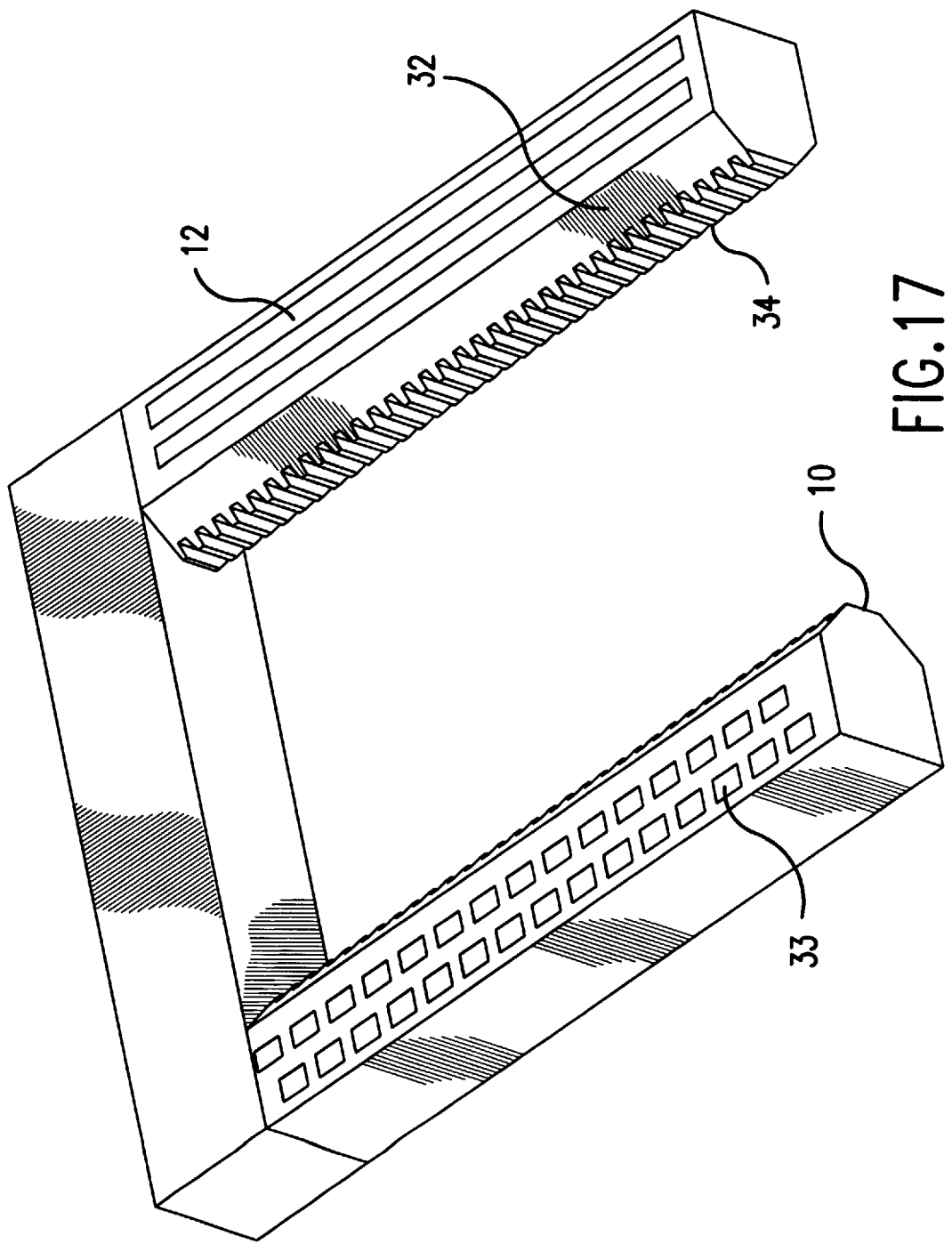
FIG. 17 shows a rack assembly with inward facing teeth and marks along one rack for servo encoding.

In FIG. 17 there is shown an inward facing rack tooth 34 embodiment with beveled edges 32 and encoding strips 33 along one rack 10.

Figure 18:
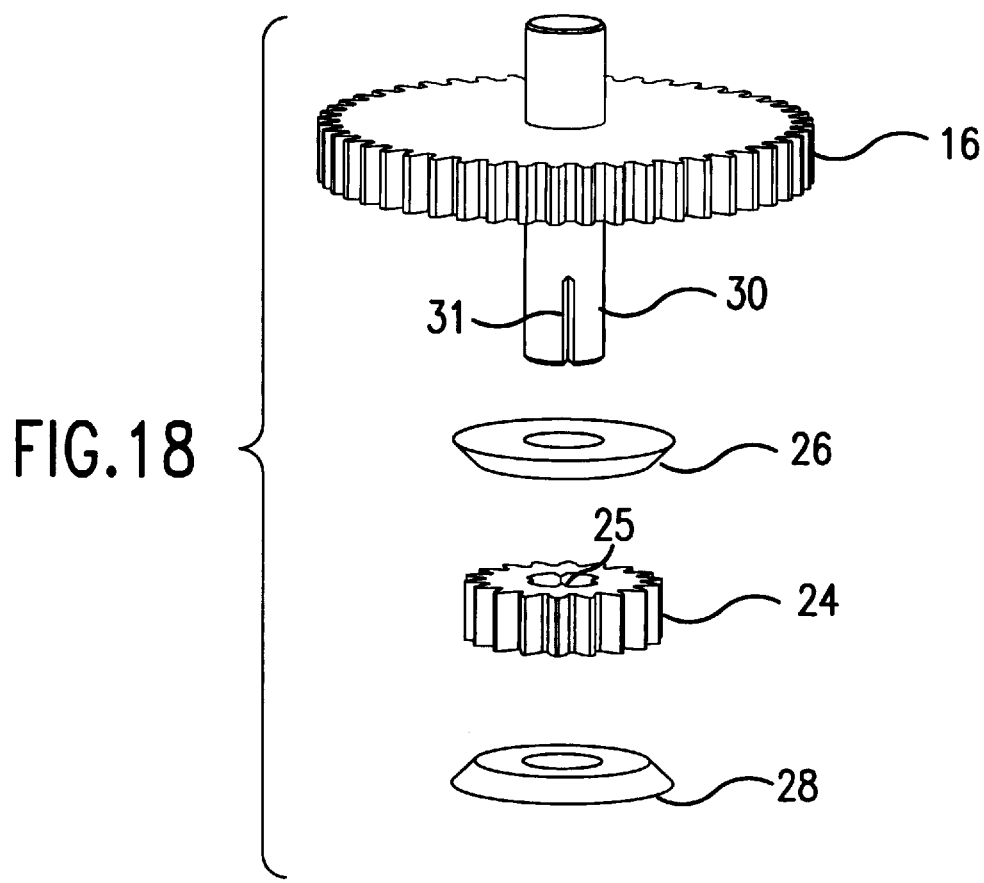
FIG. 18 shows an exploded perspective view of the assembly of FIG. 2.

In FIG. 18 there is shown an exploded view of a rack drive assembly including bevels 26 and 28 which engage the beveled surfaces 32 of the racks 10 of FIG. 17. Also shown are splines 25 and grooves 31 which connect drive gear 24 to shaft 30.

What is claimed:

1. A linear actuator comprising in combination:

a first gear rack;

a second gear rack fixed with respect to said first gear rack and parallel to said first gear rack;

wherein said gear racks face each other in opposition to each other;

a pair of first drive gears in meshing engagement with said first gear rack;

a pinion gear in contact with each of said first drive gears;

a pair of second drive gears, each in meshing engagement with said second gear rack; and each of said second drive gears in meshing engagement with one of said first drive gears.

2. A linear actuator in accordance with claim 1 further comprising back up rollers pressing against each rack in a position opposite each of said drive gears.

3. A linear actuator in accordance with claim 2 wherein said back up rollers are V-shaped rollers which engage V-shaped portions of each of said racks.

4. A linear actuator in accordance with claim 3 wherein said V-shaped portions of said racks are formed by chamfering edges of said racks.

5. A linear actuator in accordance with claim 1 further comprising:

a linear code strip on one of said gear racks;

computer control means for generating position control signals;

means for controlling a motor in accordance with control signals from said computer control means;

sliding contact rails on said gear rack;

means for sensing position of said gear rack position;

feedback means for providing position feedback data to said computer control means; and means for transmitting feedback, motor control signals, and motor power on said sliding contact power rails.

6. A linear actuator comprising in combination:

an actuator member having chamfered edges upon which gears are placed;

a plurality of gear drive members having cylindrical gears each drive member engaging one of said chamfered edges;

a plurality of backup rollers on a side opposite said drive gears for holding said actuator member against said cylindrical drive gears.

7. A linear actuator in accordance with claim 6 wherein said plurality of said backup rollers are driven geared rollers for providing drive to the actuator for stabilizing the actuator in two axes.

8. A linear actuator comprising in combination:

an actuator rack member having parallel gear teeth on opposite outwardly facing sides;

two first drive gears on a first side of said rack, said drive gears each engaging one said opposite outwardly facing sides;

two second drive gears on a second side of said rack, said drive gears each engaging the other of said opposite outwardly facing sides; and a pinion drive gear in engagement with one of said first drive gears and one of said second drive gears.

9. A linear actuator in accordance with claim 8 wherein said rack member has chamfered edges adjacent each of said rack sides and wherein said first and second drive gears have chamfered roller surfaces adjacent said drive gears for engagement with said chamfered surfaces of said rack member, when said gears are in engagement.

10. A linear actuator in accordance with claim 9 further comprising a first carrier plate for providing bearing shaft support for said first drive gears, said second drive gears, and said pinion drive gear.

11. A linear actuator in accordance with claim 10 further comprising a second carrier plate on a side of said rack member opposite from said first carrier plate for balancing bearing thrust of said shafts.

12. A linear actuator in accordance with claim 8 further comprising:

a second actuator rack member having parallel teeth on opposite sides;

third and fourth drive gears on a first side of said second rack, said third and fourth drive gears each engaging one of said opposite surfaces of said second rack;

two fourth drive gears on a second side of said second rack, said drive gears each engaging one of said opposite surfaces; and a pinion gear in engagement with said third drive gears and said fourth drive gears.

13. A linear actuator in accordance with claim 12 wherein said second actuator member includes chamfered edges adjacent gear teeth edges.

14. A linear actuator in accordance with claim 12 further comprising a first carrier plate for providing bearing support for shafts for said first, second, third, and fourth gear drives and said first and second pinion drive gears.

15. A linear actuator in accordance with claim 12 further comprising drive means for said first and second pinion gears.

16. A linear actuator comprising in combination:

an actuator member having geared teeth on two opposite outwardly facing surfaces thereof;

first and second power driven gears in engagement with one of said oppositely facing surfaces and third and fourth power driven gears in engagement with a second oppositely facing surfaces;

a pair of drive pinions in engagement with said third and fourth gears;

a motor rotor in engagement with said two drive pinions and in engagement with said first and second drive gears for driving said linear shaft.

17. The shaft actuator in accordance with claim 16 wherein said motor has a fixed center and rotating outer portion, and said outer portion has affixed thereto gear teeth which engage said first and second gears and said pinions.

18. A linear actuator comprising in combination:

a first gear rack;

a second gear rack fixed with respect to said first gear rack and parallel to said first gear rack;

a pair of first drive gears in meshing engagement with said first gear rack;

a pair of second drive gears in meshing engagement with said second gear rack;

a pinion gear in contact with one of said first gears and one of said second gears;

wherein each rack is in engagement with two drive gears which provide balanced forces on said rack.

* * * * *